(12) United States Patent
Hecht

(10) Patent No.: US 8,376,664 B2
(45) Date of Patent: Feb. 19, 2013

(54) CUTTING TOOL AND CUTTING INSERT THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 587 days.

(21) Appl. No.: 12/751,761

(22) Filed: Mar. 31, 2010

(65) Prior Publication Data

US 2010/0254773 A1    Oct. 7, 2010

(30) Foreign Application Priority Data

Apr. 7, 2009   (IL) .......................................... 198053

(51) Int. Cl.
*B23B 27/00*   (2006.01)
*B23B 27/04*   (2006.01)

(52) U.S. Cl. ...................... 407/107; 407/110
(58) Field of Classification Search .................. 407/107, 407/109, 110, 40, 50
See application file for complete search history.

(56) References Cited

U.S. PATENT DOCUMENTS

| 5,150,992 | A |   | 9/1992 | Friedmann |         |
|-----------|---|---|--------|-----------|---------|
| 5,516,241 | A | * | 5/1996 | Plutschuck et al. | 407/110 |
| 5,709,508 | A |   | 1/1998 | Barazani et al. | |
| 5,743,680 | A | * | 4/1998 | Von Haas et al. | 407/19 |
| 5,795,109 | A | * | 8/1998 | Jonsson et al. | 407/72 |
| 5,836,723 | A |   | 11/1998 | Von Haas et al. | |
| 6,116,823 | A | * | 9/2000 | Mihic | 407/40 |
| 6,234,727 | B1 | * | 5/2001 | Barazani | 407/117 |
| 6,579,044 | B1 | * | 6/2003 | Trenkwalder et al. | 407/110 |
| 7,524,147 | B2 | * | 4/2009 | Hecht | 407/107 |

FOREIGN PATENT DOCUMENTS

| DE | 86 25 267 | 2/1987 |
| EP | 1 424 151 | 6/2004 |
| EP | 1 666 179 | 6/2007 |
| JP | 3 170 205 | 7/1991 |

OTHER PUBLICATIONS

International Search Report in PCT/IL2010/000195, dated Jul. 16, 2010.

* cited by examiner

*Primary Examiner* — Will Fridie, Jr.
(74) *Attorney, Agent, or Firm* — Womble Carlyle

(57) ABSTRACT

A cutting tool has a cutting insert releasably retained in an insert pocket. The insert pocket includes a supporting portion having support surfaces and a clamping portion including a socket having a socket wall, the socket extending rearwardly from the supporting portion. The cutting insert has a cutting portion with front abutment surfaces and an elongated locating portion extending rearwardly from the cutting portion. The cutting insert is retained in the insert pocket with the front abutment surfaces abutting the support surfaces and with the locating portion located in the socket with abutment surfaces of the locating portion in abutment with the socket wall.

22 Claims, 5 Drawing Sheets

CUTTING TOOL AND CUTTING INSERT THEREFOR

FIELD OF THE INVENTION

This invention relates to a cutting insert and to a cutting tool particularly, but not exclusively, for grooving, turning, parting, and face grooving.

BACKGROUND OF THE INVENTION

A typical prior art face grooving tool is shown, for example, in FIG. 2 of U.S. Pat. No. 5,709,508, in which a cutting insert is retained in a slot formed between an upper clamping jaw and a curved lower base jaw. The slot is open on each side of the cutting insert which not only weakens the structure of the cutting tool in the region of the slot and but also means that there is no natural retention of the cutting insert in the lateral direction leading to lateral instability of the cutting insert during metal cutting operations. Clearly, this is a problem not only with face grooving tools but also with non-face grooving tools. In order to stabilize the cutting insert against lateral forces, the jaws of the tool and the upper and lower surfaces of the cutting insert can be provided with convex-concave mating surfaces in the clamping region of the cutting insert as seen in FIG. 2 of U.S. Pat. No. 5,709,508, and shown more explicitly, for example, in FIGS. 3A and 3B of U.S. Pat. No. 6,234,727.

However, a disadvantage of convex-concave mating surfaces in the clamping region, when they are applied to both the upper and lower surfaces of the clamping portion of an insert is that it restricts the minimum size of the cutting insert thereby restricting the minimum groove diameter size that can be achieved.

SUMMARY OF THE INVENTION

In accordance with one aspect of the present invention, there is provided a cutting insert having a longitudinal plane of symmetry and comprising a cutting portion and an elongated locating portion extending rearwardly from the cutting portion, the locating portion having a dividing plane perpendicular to the longitudinal plane of symmetry.

The cutting portion has a rake surface, an opposing base surface and a peripheral side surface extending therebetween, the peripheral side surface meeting the rake surface at an edge at least a portion of which forms a cutting edge. The base surface has a front abutment member having two front abutment surfaces located symmetrically on either side of and inclined with respect to the longitudinal plane of symmetry.

The locating portion is provided with protruding rear and intermediate abutment members and has a longitudinal axis formed at the intersection of the dividing plane and the longitudinal plane of symmetry. The rear abutment member is distal the cutting portion and the intermediate abutment member is located closer to the cutting portion than the rear abutment member. The rear abutment member has two rear abutment surfaces located symmetrically on either side of the longitudinal plane of symmetry and the intermediate abutment member has two intermediate abutment surfaces located symmetrically on either side of the longitudinal plane of symmetry.

The front and rear abutment members are located on one side of the dividing plane and the intermediate abutment member is located on the other side of the dividing plane.

In accordance with some embodiments, the rear and intermediate abutment surfaces are located on a common curved surface.

In accordance with some embodiments, the common curved surface is an oblique conical surface.

In accordance with some embodiments, the common curved surface is a cylindrical surface.

In accordance with some embodiments, the front abutment surfaces are planar and form an abutment angle of less than 180° therebetween.

In accordance with some embodiments, the front abutment surfaces are planar and form an abutment angle of greater than 180° therebetween.

In accordance with another aspect of the present invention, there is also provided a cutting tool comprising an insert holder in which a cutting insert as described above is removably retained in an insert pocket, the insert pocket comprising supporting portion and a clamping portion, the supporting portion having a support member comprising support surfaces and the clamping portion comprising a socket extending rearwardly from the supporting portion, the socket having a socket wall. The cutting insert is retained in the insert pocket with the front abutment surfaces abutting the support surfaces and with the locating portion located in the socket with the rear and intermediate abutment surfaces abutting the socket wall.

In accordance with some embodiments, the rear and intermediate abutment surfaces are located on a common curved surface and the socket wall generally matches in shape the common curved surface.

In accordance with some embodiments, the common curved surface is an oblique conical surface.

In accordance with some embodiments, the common curved surface is a cylindrical surface.

In accordance with some embodiments, the front abutment member has a shape that is complementary to the shape of the support member.

In accordance with some embodiments, the front abutment surfaces are planar and form an abutment angle therebetween and the support surfaces form an angle therebetween that is complementary to the abutment angle.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
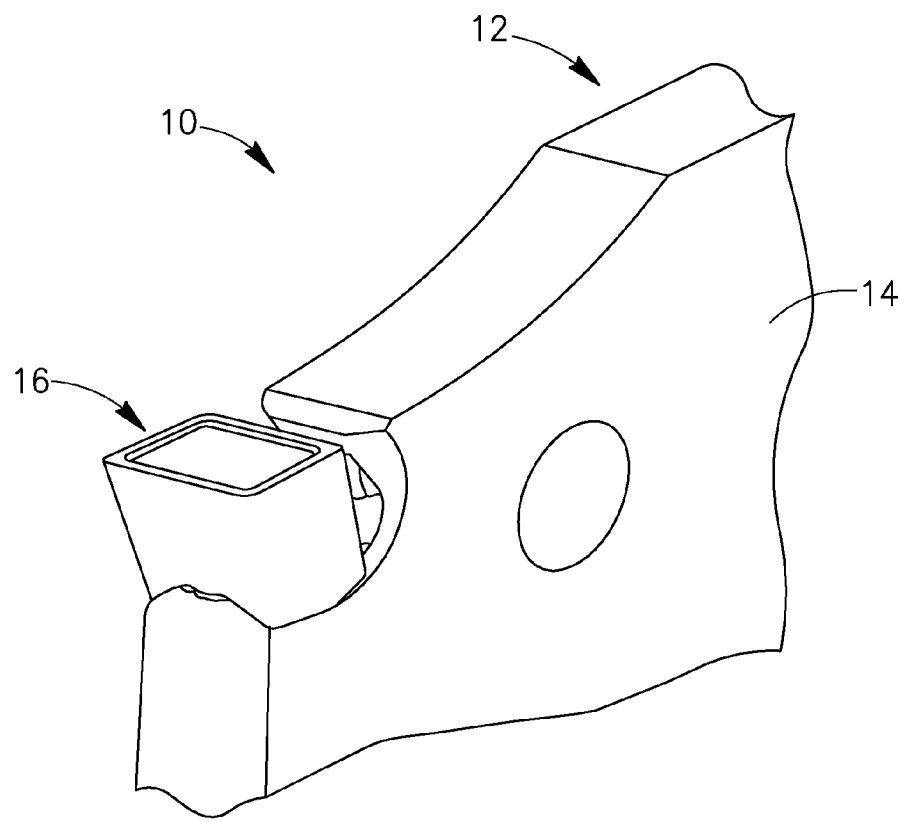
FIG. 1 is a front perspective view of a cutting section of a cutting tool in accordance with embodiments of the present invention.
Figure 2:
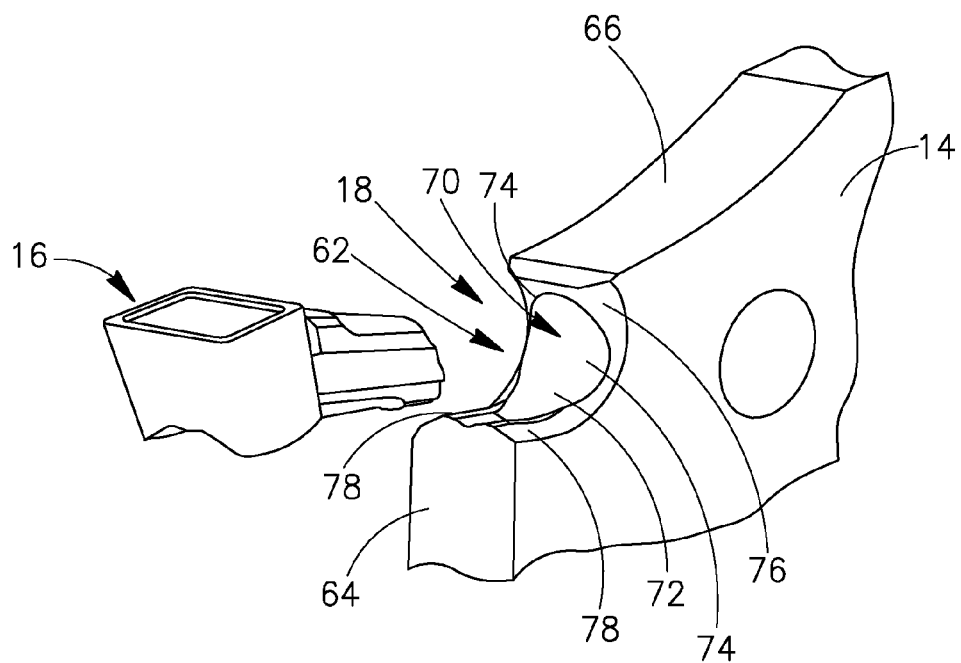
FIG. 2 is an exploded view of a front perspective view of a section portion of a cutting tool in accordance with embodiments of the present invention.
Figure 3:
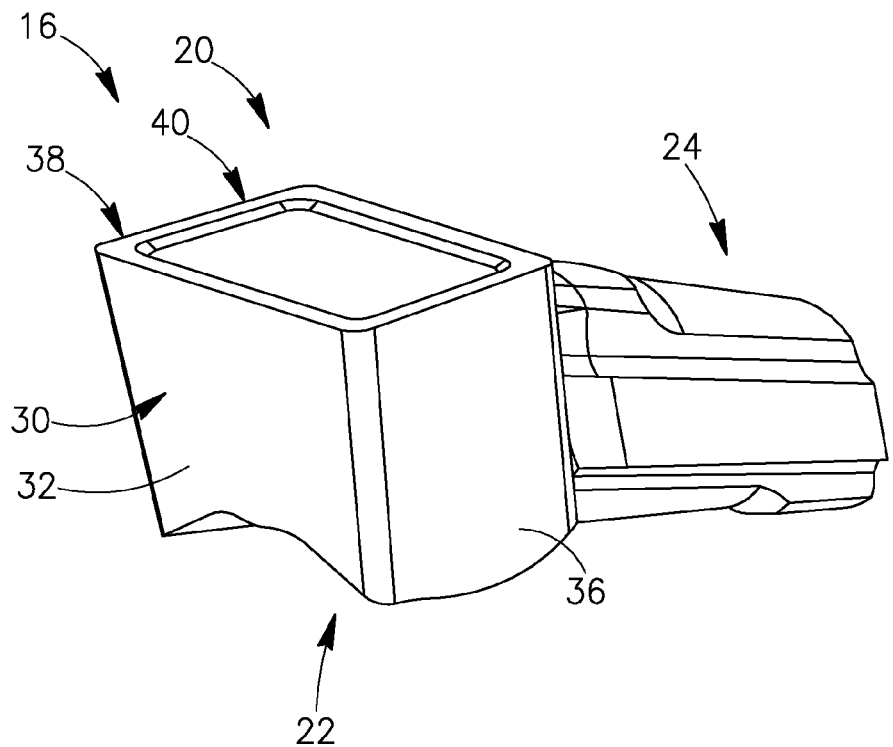
FIG. 3 is a front perspective view of a cutting insert in accordance with embodiments of the present invention.
Figure 4:
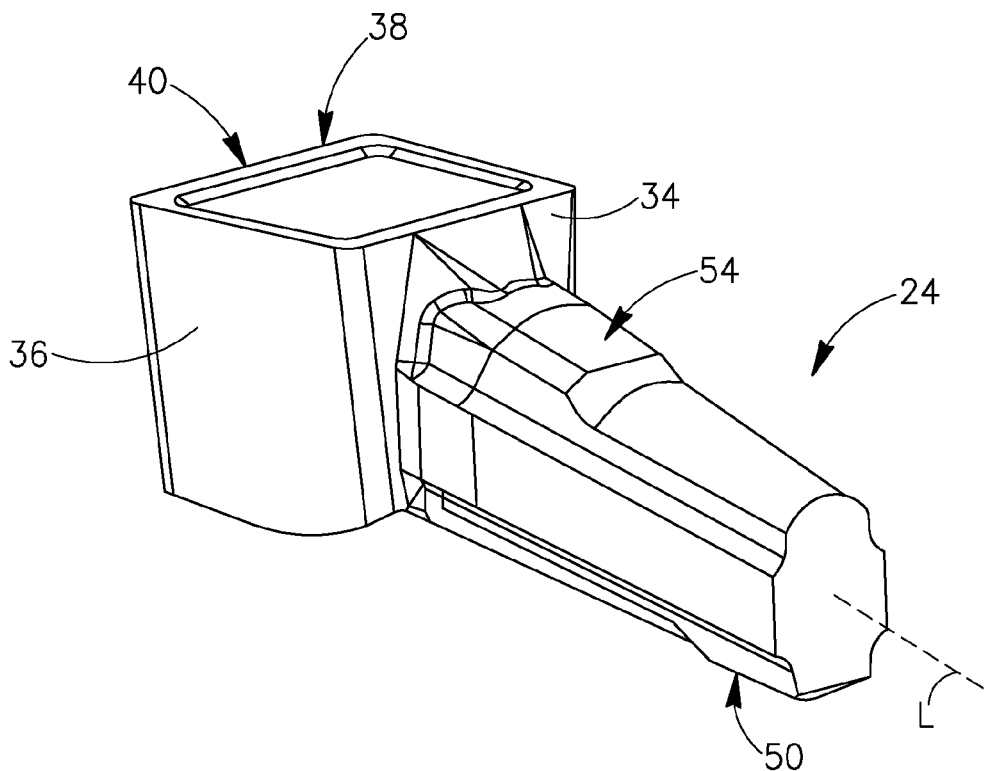
FIG. 4 is a rear perspective view of a cutting insert in accordance with embodiments of the present invention.

Attention is first drawn to FIGS. 1 and 2 showing a cutting section 10 of a cutting tool 12 in accordance with embodiments of the invention. The cutting tool 12 includes an insert holder 14 and a cutting insert 16 with the cutting insert 16 secured in an insert pocket 18 of the insert holder 14 in FIG. 1 and with the cutting insert 16 removed from the insert pocket 18 in FIG. 2.

The cutting insert 16 is shown in detail in FIGS. 3 to 8. The cutting insert 16 has a cutting portion 20 at a forward end 22 of the cutting insert 16 and an elongated locating portion 24 extending rearwardly from the cutting portion 20. The cutting insert 16 is preferably, but not necessarily, made of cemented carbide such as, for example, tungsten carbide. The cutting insert 16 may be made by a pressing, or injection molding, and sintering process. The cutting insert 16 may also be ground. The elongated locating portion 24 has a longitudinal axis L defined at the intersection of two planes, a longitudinal plane of symmetry P1 of the cutting insert 16 and a dividing plane P2 of the locating portion 24. These planes will be described in greater detail herein below with respect to certain features of the cutting insert 16.

The cutting portion 20 has a rake surface 26 a base surface 28 and a peripheral side surface 30 extending therebetween. In accordance with some embodiments, the peripheral side surface 30 includes a front surface 32, an opposing rear surface 34 and two opposing side surfaces 36 extending between the front and rear surfaces 32, 34. The locating portion 24 extends rearwardly from the rear surface 34, or equivalently, the locating portion 24 extends rearwardly from the cutting portion 20. The peripheral side surface 30 meets the rake surface 26 at an edge 38 at least a portion of which forms a cutting edge 40. In some embodiments, the front surface 32 meets the rake surface 26 at a front cutting edge 42. In accordance with some embodiments, the side surfaces 36 and the rake surface 26 may meet at side cutting edges 44.

The cutting portion 20 has a front abutment member 46 associated with the base surface 28. The front abutment member 46 has two front abutment surfaces 48 located symmetrically on either side of and inclined with respect to the longitudinal plane of symmetry P1. In accordance with some embodiments, the front abutment surfaces 48 may be planar and may form an abutment angle α of less than 180° therebetween. In accordance with other embodiments, the front abutment surfaces 48 may be planar and may form an abutment angle α of greater than 180° therebetween.

The locating portion 24 has a rear abutment member 50 distal the cutting portion 20 having two rear abutment surfaces 52 located symmetrically on either side of the longitudinal plane of symmetry P1. The locating portion 24 also has an intermediate abutment member 54 located closer to the cutting portion 20 than the rear abutment member 50. The intermediate abutment member 54 has two intermediate abutment surfaces 56 located symmetrically on either side of the longitudinal plane of symmetry P1.

Figure 5:
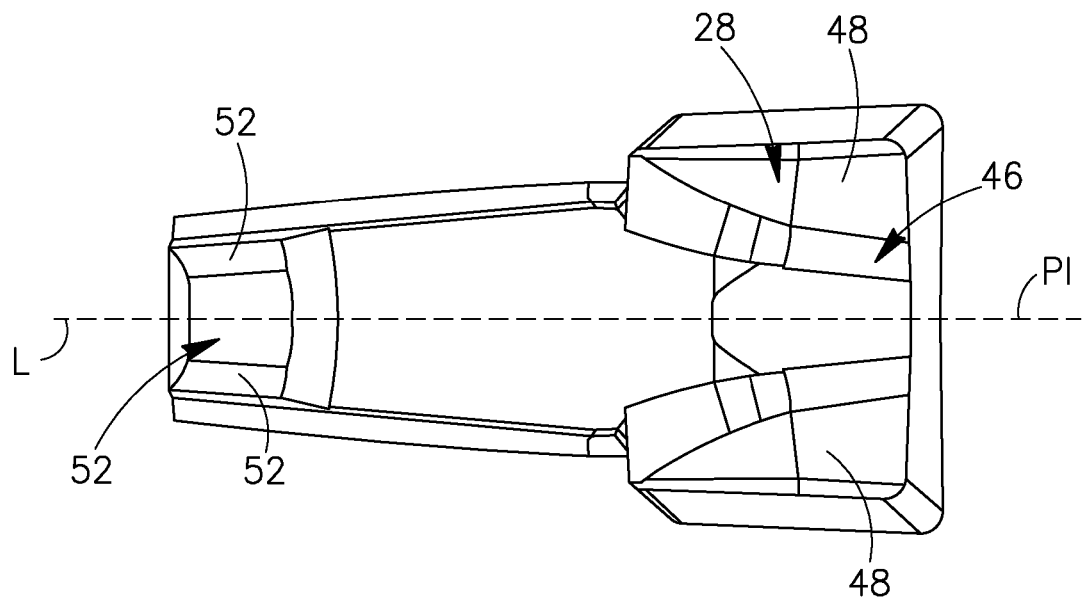
FIG. 5 is a bottom view of a cutting insert in accordance with embodiments of the present invention.
Figure 6:
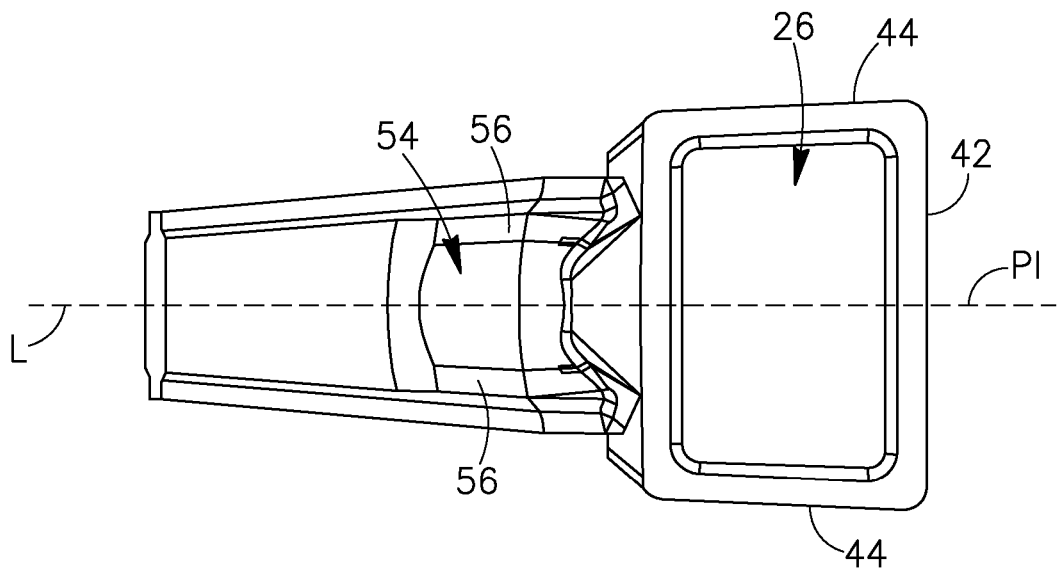
FIG. 6 is a top view of a cutting insert in accordance with embodiments of the present invention.
Figure 7:
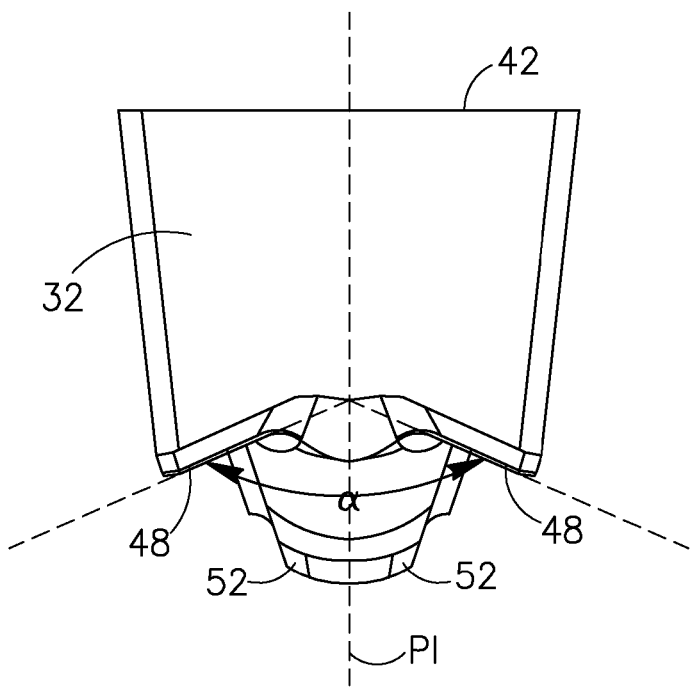
FIG. 7 is a front view of a cutting insert in accordance with embodiments of the present invention.
Figure 8:
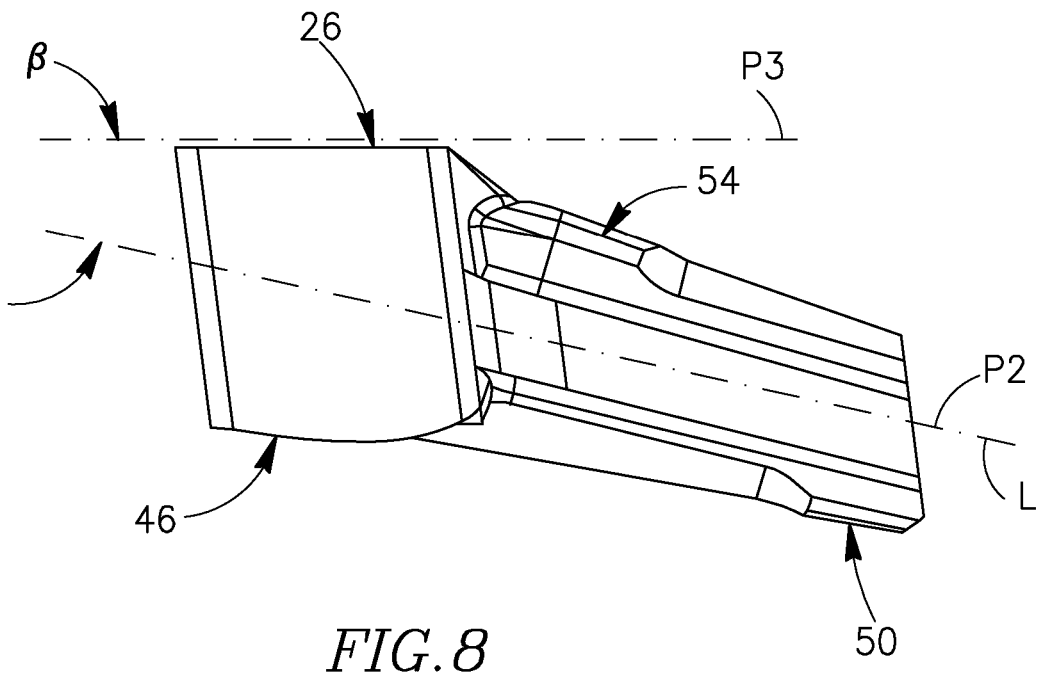
FIG. 8 is a side view of a cutting insert in accordance with embodiments of the present invention.

The front and rear abutment members 46, 50 are located on one side of the dividing plane P2 and the intermediate abutment member 54 is located on the other side of the dividing plane P2. In accordance with some embodiments, the rake surface 26 and the intermediate abutment member 54 are located on the same side of the dividing plane P2. Thus, as seen in FIGS. 5 and 6, the rake surface 26 and the intermediate abutment member 54 are visible in a top view of the insert, while the front and rear abutment members 46, 50 are visible in a bottom view of the insert. The rear and intermediate abutment members 50, 54 protrude from the locating portion 24, so that their respective abutment surfaces, the rear and intermediate abutment surfaces 52, 56 are raised with respect to the rest of the surface of the locating portion 24.

The rear and intermediate abutment surfaces 52, 56 may be curved. In accordance with some embodiments the rear and intermediate abutment surfaces 52, 56 are located on a common curved surface. The common curved surface may be a conical surface. In accordance with some embodiments the locating portion 24 may extend rearwardly and downwardly from the cutting portion 20 so that, in a side view of the insert, the longitudinal axis L of the locating portion 24 forms an acute angle β with a plane P3 perpendicular to the longitudinal plane of symmetry and generally lying in the rake surface 26. In accordance with some embodiments, the conical surface may be an oblique conical surface. In accordance with some embodiments, the common curved surface may be a cylindrical surface.

Figure 9:
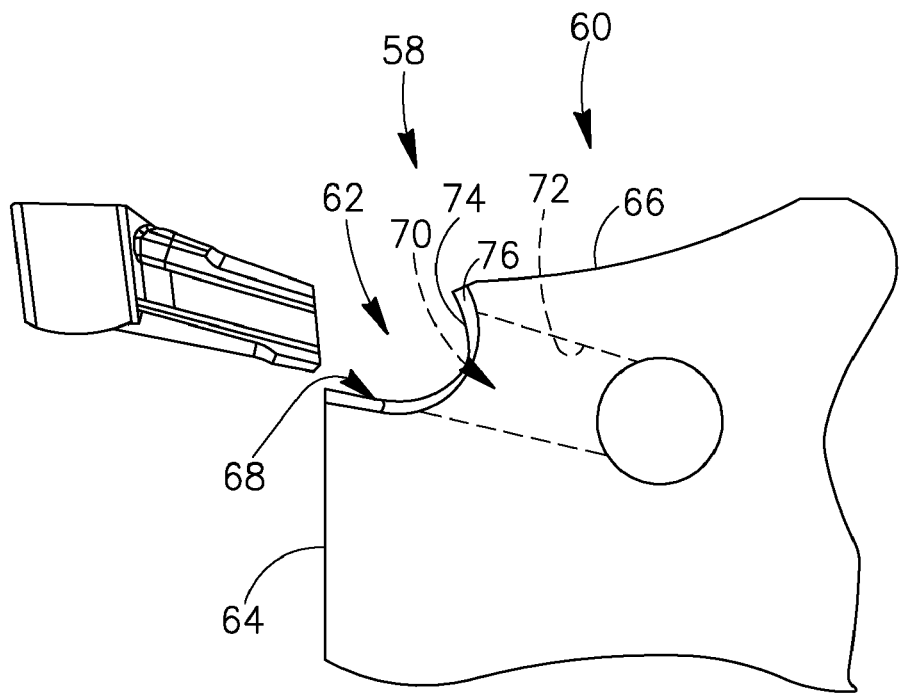
FIG. 9 is an exploded view of a side view of a cutting section of a cutting tool in accordance with embodiments of the present invention.
Figure 10:
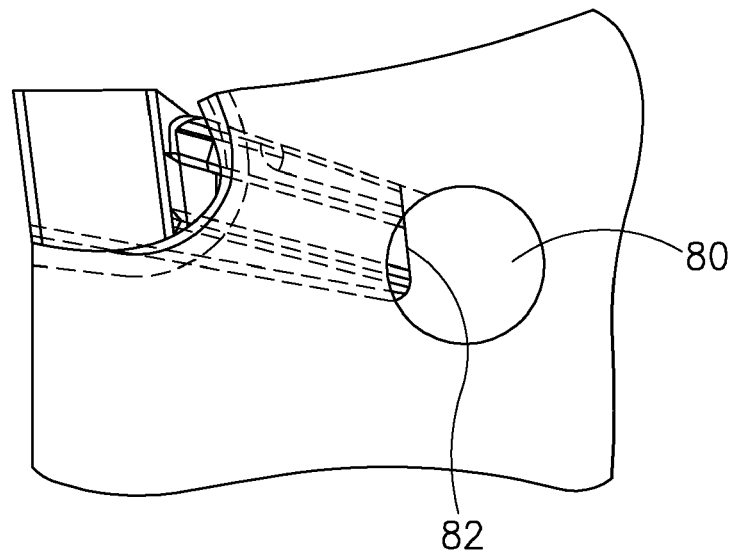
FIG. 10 is a side view of a cutting section of a cutting tool in accordance with embodiments of the present invention.

Attention is now reverted to FIG. 2 and in addition attention is drawn to FIGS. 9 and 10. The insert pocket 18 has a forward supporting portion 58 and a rear clamping portion 60. The supporting portion 58 is located in a recess 62 formed at a corner of the insert holder 14 between a holder front surface 64 and a holder top surface 66. The supporting portion 58 has a support member 68. The clamping portion 60 includes a socket 70 having a socket wall 72 that opens out to the recess 62 at a socket aperture 74. The socket 70 extends rearwardly from the supporting portion 58. The socket wall 72 is shaped to frictionally engage the rear and intermediate abutment surfaces 52, 56 of the locating portion 24. Since the rear and intermediate abutment members 50, 54 protrude from the locating portion 24, only their respective abutment surfaces, the rear and intermediate abutment surfaces 52, 56 engage the socket wall 72. In accordance with some embodiments, the socket wall 72 may be conical in shape, or may be oblique conical in shape. In accordance with some embodiments, the socket wall 72 may be cylindrical in shape. The socket aperture 74 is surrounded, at least partially, by a generally forward facing aperture wall 76 adjacent the support member 68. The clamping portion 60 extends rearwardly from the socket aperture 74. The support member 68 has two support surfaces 78 forming an angle between them that is complementary to the abutment angle α so that the support surfaces 78 and the front abutment surfaces 48 can fittingly engage each other. The front abutment member 48 has a concave V-shaped form whereas the support member 68 has a complementary convex V-shaped form.

The cutting insert 16 is secured to the insert pocket 18 with an interference fit by placing the locating portion 24 in the socket 70, with the front abutment and support members 46, 68 aligned, and forcing the locating portion 24 into the socket 70 until the rear and intermediate abutment surfaces 52, 56 abut and frictionally engage the socket wall 72 and the front abutment surfaces 48 abut the support surfaces 78. Forming the front abutment and support members 46, 68 with complementary V-shaped forms provides lateral stabilization of the cutting insert 16 and precise location of the edge 38 in general and the cutting edge 40 in particular. The cutting edge 40 may include the front cutting edge 42 and or the side cutting edge 42. However, in contrast with the prior art, the locating portion 24 of the cutting insert 16 is located in the clamping portion's socket 70, which is closed on the sides giving rise to a stronger structure than prior art clamping portions. Thus, in some embodiments, at least a portion of the locating portion 24 is circumferentially surrounded by the socket wall 70.

The cutting insert 16 may be removed from the insert pocket 18 by introducing a suitable implement between the aperture wall 76 and the rear surface 34 of the cutting portion 20 and by prying the locating portion 24 out of the socket 70. In accordance with some embodiments, the insert holder 14 is provided with a removal-access aperture 80 adjacent a rear end 82 of the locating portion 24, enabling an insert-removing device access to the rear end 82 of the locating portion 24 in order to apply a force to the rear end 82 of the locating portion 24 to force the locating portion 24 out of the socket 70.

It will be appreciated that the provision of three abutment members, the rear and intermediate abutment members 50, 54 on the locating portion 24 and the front abutment member 46 on the cutting portion 20 facilitates on the one hand the precise location of the edge 38 in general and the cutting edge 40 in particular, due to the front abutment surfaces 48 abutting the support surfaces 78, and on the other hand the secure and rigid clamping of the cutting insert 16 in the insert pocket 18 due to the frictional engagement of the rear and intermediate abutment surfaces 52, 56 by the socket wall 72 of the socket 70, without having open side walls in the vicinity of the locating portion 20. It will further be appreciated that if the locating portion 24 was not provided with protruding abutment members (the rear and intermediate abutment members 50, 54) but was a single smooth surface, it would be difficult, if not impossible for the locating portion 24 to frictionally engage the socket wall 72 whilst at the same time ensuring that the front abutment surfaces 48 will abut the support surfaces 78, since the system would be over constrained.

Although the present invention has been described to a certain degree of particularity, it should be understood that various alterations and modifications can be made without departing from the spirit or scope of the invention as hereinafter claimed.

What is claimed is:

1. A cutting insert (16) having a longitudinal plane of symmetry (P1) and comprising a cutting portion (20) and an elongated locating portion (24) extending rearwardly from the cutting portion (20), the locating portion (24) having a dividing plane (P2) perpendicular to the longitudinal plane of symmetry (P1);
   the cutting portion (20) having a rake surface (26), an opposing base surface (28) and a peripheral side surface (30) extending therebetween, the peripheral side surface (30) meeting the rake surface (26) at an edge (38) at least a portion of which forms a cutting edge (40), the base surface (28) has a front abutment member (46) having two front abutment surfaces (48) located symmetrically on either side of and inclined with respect to the longitudinal plane of symmetry (P1),
   the locating portion (24) being provided with protruding rear and intermediate abutment members (50, 54) and having a longitudinal axis (L) formed at the intersection of the dividing plane (P2) and the longitudinal plane of symmetry (P1), the rear abutment member (50) being distal the cutting portion (20) and the intermediate abutment member (54) being located closer to the cutting portion (20) than the rear abutment member (50), the rear abutment member (50) having two rear abutment surfaces (52) located symmetrically on either side of the longitudinal plane of symmetry (P1) and the intermediate abutment member having two intermediate abutment surfaces (56) located symmetrically on either side of the longitudinal plane of symmetry (P1), wherein:
   the front and rear abutment members (46, 50) are located on one side of the dividing plane (P2) and the intermediate abutment member (54) is located on the other side of the dividing plane (P2).

2. The cutting insert (16) according to claim 1, wherein the rear and intermediate abutment surfaces (52, 56) are located on a common curved surface.

3. The cutting insert (16) according to claim 2, wherein the common curved surface is an oblique conical surface.

4. The cutting insert (16) according to claim 2, wherein the common curved surface is a cylindrical surface.

5. The cutting insert (16) according to claim 1, wherein the front abutment surfaces (48) are planar and form an abutment angle (α) of less than 180° therebetween.

6. The cutting insert (16) according to claim 1, wherein the front abutment surfaces (48) are planar and form an abutment angle (α) of greater than 180° therebetween.

7. The cutting insert (16) according to claim 1, wherein:
   the rake surface (26) and the intermediate abutment member (54) are visible in a top view of the insert; and
   the front and rear abutment members (46, 50) are visible in a bottom view of the insert.

8. A cutting tool comprising:
   an insert holder (14) having an insert pocket (18), the insert pocket (18) comprising a supporting portion (58) and a clamping portion (60), the supporting portion (58) having a support member (68) comprising support surfaces (78) and the clamping portion (60) comprising a socket (70) extending rearwardly from the supporting portion (58), the socket (70) having a socket wall (72); and
   a cutting insert (16) removably retained in the insert pocket (18); wherein:
   the cutting insert is in accordance with claim 1;
   the front abutment surfaces (48) abut the support surfaces (78); and
   the locating portion (24) is located in the socket (70) with the rear and intermediate abutment surfaces (52, 56) abutting the socket wall (72).

9. The cutting tool according to claim 8, wherein the rear and intermediate abutment surfaces (52, 56) are located on a common curved surface and the socket wall (72) generally matches in shape the common curved surface.

10. The cutting tool according to claim 9, wherein the common curved surface is an oblique conical surface.

11. The cutting tool according to claim 9, wherein the common curved surface is a cylindrical surface.

12. The cutting tool according to claim 8, wherein the front abutment member (46) has a shape that is complementary to the shape of the support member (68).

13. The cutting tool according to claim 8, wherein the front abutment surfaces (48) are planar and form an abutment angle (α) therebetween and the support surfaces (78) form an angle therebetween that is complementary to the abutment angle (α).

14. The cutting tool according to claim 8, wherein:
   at least a portion of the locating portion (24) is circumferentially surrounded by the socket wall (70).

15. The cutting tool according to claim 8, wherein:
   the rake surface (26) and the intermediate abutment member (54) are visible in a top view of the insert; and
   the front and rear abutment members (46, 50) are visible in a bottom view of the insert.

16. A cutting insert (16) having a longitudinal plane of symmetry (P1) and comprising:
   a cutting portion (20) having a rake surface (26), an opposing base surface (28) and a peripheral side surface (30) extending therebetween, the peripheral side surface (30)

meeting the rake surface (26) at an edge (38) at least a portion of which forms a cutting edge (40), the base surface (28) having a front abutment member (46) having two front abutment surfaces (48) located symmetrically on either side of and inclined with respect to the longitudinal plane of symmetry (P1); and an elongated locating portion (24) extending rearwardly from the cutting portion (20) and having a longitudinal axis (L), the locating portion (24) being provided with protruding rear and intermediate abutment members (50, 54), the rear abutment member (50) being distal the cutting portion (20) and the intermediate abutment member (54) being located closer to the cutting portion (20) than the rear abutment member (50), the rear abutment member (50) having two rear abutment surfaces (52) located symmetrically on either side of the longitudinal plane of symmetry (P1), the intermediate abutment member having two intermediate abutment surfaces (56) located symmetrically on either side of the longitudinal plane of symmetry (P1), wherein:

the rake surface (26) and the intermediate abutment member (54) are visible in a top view of the insert; and the front and rear abutment members (46, 50) are visible in a bottom view of the insert.

17. The cutting insert (16) according to claim 16; wherein:

the locating portion (24) has a dividing plane (P2) perpendicular to the longitudinal plane of symmetry (P1);

the longitudinal axis (A) is formed at the intersection of the dividing plane (P2) and the longitudinal plane of symmetry (P1);

the front and rear abutment members (46, 50) are located on one side of the dividing plane (P2); and the intermediate abutment member (54) is located on the other side of the dividing plane (P2).

18. A cutting tool comprising:

an insert holder (14) having an insert pocket (18), the insert pocket (18) comprising a supporting portion (58) and a clamping portion (60), the supporting portion (58) having a support member (68) comprising support surfaces (78) and the clamping portion (60) comprising a socket (70) extending rearwardly from the supporting portion (58), the socket (70) having a socket wall (72); and a cutting insert (16) removably retained in the insert pocket (18), wherein:

the cutting insert is in accordance with claim 16;

the front abutment surfaces (48) abut the support surfaces (78); and the locating portion (24) is located in the socket (70) with the rear and intermediate abutment surfaces (52, 56) abutting the socket wall (72).

19. The cutting tool according to claim 18, wherein:

the rear and intermediate abutment surfaces (52, 56) are located on a common curved surface; and the socket wall (72) generally matches in shape the common curved surface.

20. The cutting tool according to claim 18, wherein:

the front abutment member (46) has a shape that is complementary to the shape of the support member (68).

21. The cutting tool according to claim 18, wherein:

the front abutment surfaces (48) are planar and form an abutment angle ($\alpha$) therebetween; and the support surfaces (78) form an angle therebetween that is complementary to the abutment angle ($\alpha$).

22. The cutting tool according to claim 18, wherein:

at least a portion of the locating portion (24) is circumferentially surrounded by the socket wall (70).

* * * * *